Patented June 30, 1925.

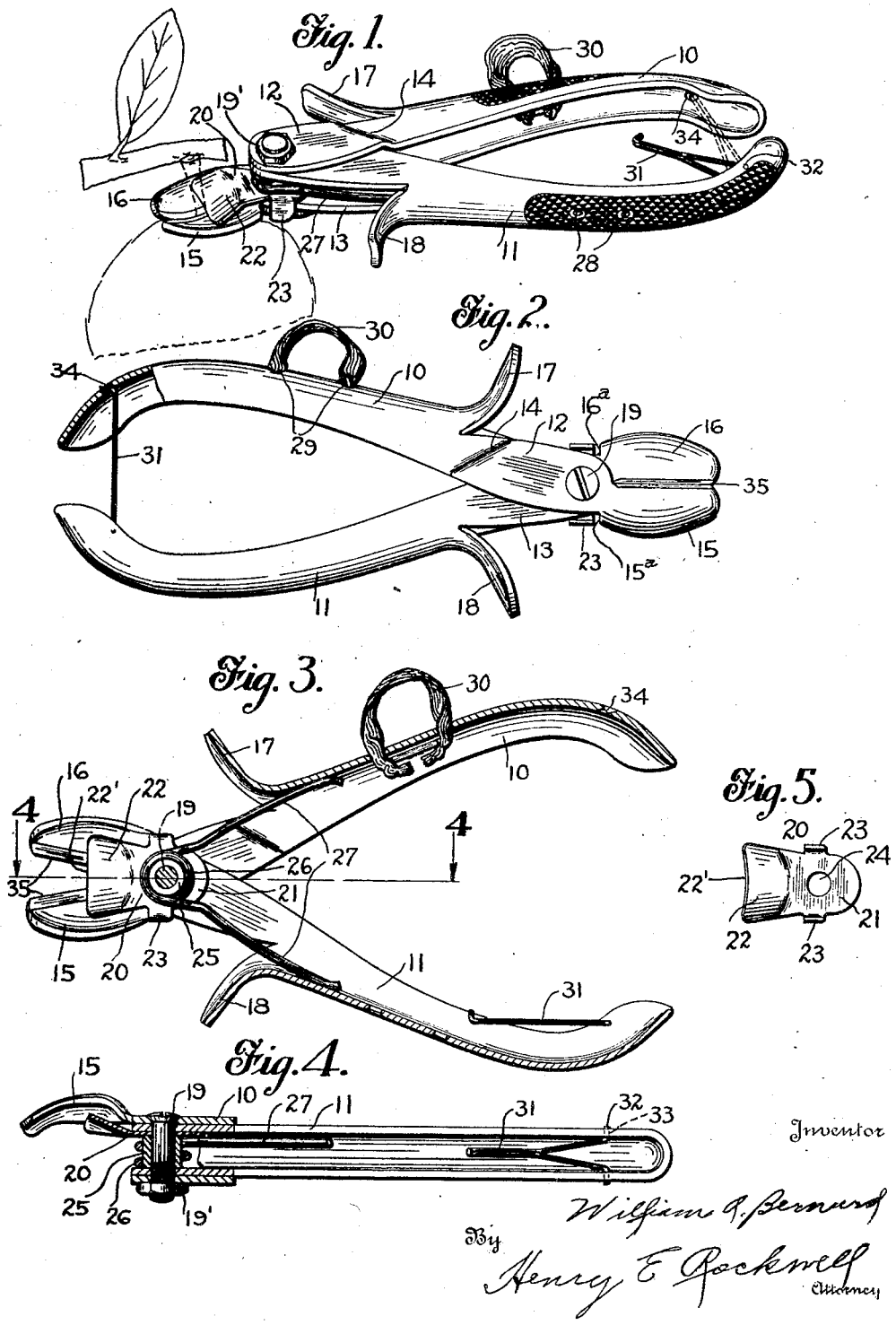

1,543,899

UNITED STATES PATENT OFFICE.

WILLIAM A. BERNARD, OF NEW HAVEN, CONNECTICUT, ASSIGNOR TO THE WILLIAM SCHOLLHORN COMPANY, OF NEW HAVEN, CONNECTICUT.

HAND TOOL.

Application filed January 27, 1921. Serial No. 440,383.

*To all whom it may concern:*

Be it known that I, WILLIAM A. BERNARD, a citizen of the United States, residing in New Haven, county of New Haven, State of Connecticut, have invented certain new and useful Improvements in Hand Tools, of which the following is a full, clear, and exact description.

This invention relates to hand tools, and more particularly to a hand tool of the plier or lever handle type which is particularly adapted to be used as a fruit clipper designed for cutting hand picked fruit, such as oranges, from the trees.

A general object of the invention is the provision of a simple, convenient and efficient tool for this purpose, that is particularly rigid in construction and by means of which the fruit may be clipped closely with very little or no stem projection, although it will be understood that certain features of the invention are useful in tools designed for other purposes.

A more specific object of my invention is to provide an improved hand tool wherein the pivoted jaws are so connected that they will be caused to meet evenly and squarely and will always be kept in alignment with each other.

Another object of the invention is to provide an improved means for determining the point longitudinally of the cutting edges, at which the cutting action shall take place and for limiting the opening movement of the lever handles.

A still further object of the invention is the provision of a simple and efficient method of holding the jaws of the tool in closed position so that it may readily be carried in the pocket of the user, with the occupation of a minimum amount of space, and also the provision of various other features which serve to increase the usefulness of the tool and to render it more convenient in operation.

To these and other ends the invention consists in the novel features and combinations of parts to be hereinafter described and claimed.

In the accompanying drawing:

Fig. 1 is a perspective view of a fruit clipper embodying my improvements;

Fig. 2 is a side elevation of the same, showing the jaws in closed position;

Fig. 3 is a view from the opposite side, showing the jaws in open position and the lever handles in section;

Fig. 4 is a sectional view on line 4—4 of Fig. 3; and

Fig. 5 is a detailed view of the stop used in connection with the movable jaws.

My improved tool consists of the two lever handles 10 and 11, which are preferably constructed of sheet metal. These levers are U-shaped in cross section, the rounded portion of the U being disposed on the outward side so that a good grip on the levers may be obtained. The levers are provided at their forward ends with forked portions 12 and 13 respectively, the forked portions 12 of the lever 10 being spread slightly, as shown at 14, so that the forked portions of the other lever may be received therebetween.

One of the forked portions 12 and an adjacent one of the forked portions 13 are extended to form the jaws 15 and 16 respectively, which are cup-shaped, as shown in Figs. 1, 3 and 4, and which constitute the cutting jaws of the tool. The lever handles 10 and 11 are provided with guards 17 and 18, which, as shown, may be struck up from the material forming the lever handle and will serve to assist the operator in maintaining his grip on the tool. These guards, as shown, will allow the fingers of the operator to approach closely adjacent the cutting edges of the jaws so that he will be able to grip the tool close to the working parts of the same. The shape of the jaws 15 and 16 will, as shown in Fig. 1, enable the operator to effect a close clip on the fruit so that no stem at all, or a very short stem, will remain.

The lever handles are pivoted together by being perforated and a pivot pin 19 passed through these perforations. The pin 19 may be threaded and receive a nut 19' which will maintain the lever handles in operative position.

A stop 20, as shown in Fig. 5, is provided, consisting of a body portion 21, a stop portion 22, which is shaped to conform to the shape of the jaws 15 and 16, and which is adapted to be mounted upon the pin 19 with the stop portion 22 projecting within the cupped space formed by the jaws. It is apparent that with the stop mounted in this position the forward edge 22' of the stop will serve to limit the distance to which a stem may be inserted between the jaws, and in this way will serve to determine the point lengthwise of the jaws at which the cutting action will take place. This stop is perforated at 24 for the reception of the pivot pin 19 and is also provided with two upstanding lugs 23 which, when the stop is operatively mounted upon the pin 19, will be in position to engage the shoulders 15ª and 16ª upon the jaws 15 and 16 and serve to limit the spreading movement of the same.

A spacing collar 25 is mounted upon the pin 19, as shown in Fig. 4, the upper edge of which abuts the stop 20 and maintains it in position upon the pin 19, closely adjacent the cutting jaws. A spiral spring 26 is wound about the collar 25, having its ends extended to bear against the lever handles 10 and 11. This spring is so tensioned that these extended ends 27 will tend to retain the lever handles in open position.

The lever handles are provided also with perforations 29, through which a loop 30 of flexible material may be passed, which loop will be adapted to receive the finger of the operator so that all danger of the tool being dropped will be obviated. The lever handles are provided also with a hook 31, which, in the embodiment shown, consists of a wire, bent into suitable shape, with the two ends 32 spread and projecting in a lateral direction through perforations 33 in one of the lever handles. The other lever handle is provided with a cooperating opening 34, which receives the free end of the hook to maintain the two lever handles in closed position, as shown in Fig. 2. When the tool is in this position, as shown, it may be conveniently carried in the pocket of the operator, where it will occupy a minimum of space and where it can be safely carried without danger of the two arms becoming loose and being spread apart by the action of the spring 26.

From the foregoing description it will be seen that I have provided a very simple and efficient tool of this type, by means of which fruit, such as oranges or the like, may be closely clipped, the cutting operation always taking place at the point of the jaws which is determined by the stop member 20. When the improved tool is used for gathering oranges, for example, the tool, while the jaws are maintained in open position by the spring, has its cutters thrust over the fruit stem as far as will be permitted by the stop member. The lever handles are then closed together and the stem will be clipped off by the cutting edges. When the lever handles are released by the operator and allowed to resume an open position, their movement will be limited by the lugs 23 formed upon the stop member so that they will be prevented from being swung by the spring 26 to a position where it would be difficult for them to be grasped by the hand of the operator and closed again.

The cutting edges 35 of the jaws will always be maintained in alignment, so that they will always meet and not be caused to run past each other, by the provision of the box joint of the forked portions of the lever arms. The provision of the box joint or the spacing of the forked portions of one of the lever handles so that they will embrace the forked portions of the other lever handle at the pivotal joint thereof will form an extremely strong joint, which, when the cutting jaws are formed as extensions of the forked portions of the handles, will be an important factor in maintaining these jaws in the proper relation to each other as the outer forked portions of one of the lever handles will retain the inner forked portions of the other lever handle against movement along the pivot pin 19 in either direction.

When the pin 19 is removed the parts of the tool may be dis-assembled so that the jaws may be sharpened or any part renewed if desired and the parts then re-assembled in a very simple manner.

While I have shown and described a preferred embodiment of my invention, it is to be understood that the same is not limited to the exact forms shown in all of its details, but that various modifications and variations are possible which will fall within the spirit of the invention and the scope of the appended claims.

What I claim is:

1. In a fruit clipper, a pair of pivoted lever members, two cooperating jaws operated thereby, and a stop member secured by the pivot of said lever members extending over said jaws to limit the insertion of an object between the jaws and having means thereon to limit the opening movement of the jaws.

2. A fruit clipper comprising a pair of pivoted lever members, two cooperating jaws operated thereby, and a single means to limit the opening movement of the lever members and to limit the insertion of an object between the jaws.

3. A fruit clipper comprising a pair of pivoted lever members, two cooperating jaws operated thereby and commonly pivoted means to limit the insertion of an object between the jaws and having means thereon to limit the opening movement of the handles.

4. In a fruit clipper, a pair of pivoted lever members, two cooperating jaws operated thereby, and a stop member commonly pivoted with the lever members acting against said lever members to limit the opening movement thereof.

5. In a fruit clipper, a pair of pivoted lever members, two cooperating jaws operated thereby, and means commonly pivoted with the lever members and acting against same to limit the opening movement thereof, and extending over said jaws to limit the insertion of an object between the jaws.

6. In a fruit clipper, a pair of lever members, two cup-shaped jaws operated thereby and a cup shaped stop member adapted to limit the insertion of an object therebetween.

7. In a hand tool, a pair of cooperating jaws pivoted together, a pair of lever members to operate the same, lever pivoting means and a stop associated with said jaws and pivoted between portions of the lever member by said lever pivoting means.

8. In a hand tool, two cooperating jaws, a pair of lever members to operate said jaws, a pin on which said levers are pivoted, a stop member, and a collar on said pin to position said stop member closely adjacent the inner surface of said jaws.

9. In a hand tool, two cooperating jaws, a pair of lever members, a pin on which said levers are pivoted, a stop member, a collar mounted on said pin to position said stop member adjacent the cooperating jaws and a spring coiled about said collar acting against the lever members to spread the same.

10. In a hand tool, two cooperating jaws, a pair of lever members to operate the jaws, having forward forked portions, and a stop for determining the point longitudinally of the jaws at which the cutting action takes place, said stop being mounted between the said forward forked portions of the levers.

11. In a hand tool, a pair of pivoted lever members, said members being U-shaped in cross section a part of the metal at one end of each of said members being struck up from the bottom of the U to provide forward forked ends on said members, and said struck up portion being bent backward to form guards on said members.

12. A hand tool comprising crossed members pivoted together, said members having handle portions and jaw portions on opposite sides of the pivotal joint and a stop member straddling said members at the joint thereof to limit the opening movement of said members.

13. In a hand tool, a pair of cooperating jaws pivoted together, a pair of handles for operating the same and a stop member having a portion thereof extending over said jaws and another portion straddling the joint thereof, said first mentioned portion limiting the insertion of an article between said jaws, said second mentioned portion limiting the opening movement of said jaws.

14. In a hand tool, a lever handle U-shaped in cross section, one end of said handle being bifurcated by forcing outward and backward the connecting metal between the legs of the U, thereby forming a guard integral with said handle from the material so forced out.

In witness whereof, I have hereunto set my hand on the 22nd day of January 1921.

WILLIAM A. BERNARD.